United States Patent
Bezold et al.

(10) Patent No.: US 10,361,945 B2
(45) Date of Patent: Jul. 23, 2019

(54) SYSTEM AND METHOD TO RECONCILE CABLING TEST RESULTS WITH CABLING TEST CONFIGURATIONS

(71) Applicant: Fluke Corporation, Everett, WA (US)

(72) Inventors: David E. Bezold, Mukilteo, WA (US); Clinton J. Wooton, Lake Stevens, WA (US)

(73) Assignee: Fluke Corporation, Everett, WA (US)

( * ) Notice: Subject to any disclaimer, the term of this patent is extended or adjusted under 35 U.S.C. 154(b) by 445 days.

(21) Appl. No.: 14/878,860

(22) Filed: Oct. 8, 2015

(65) Prior Publication Data
US 2017/0104664 A1  Apr. 13, 2017

(51) Int. Cl.
*H04L 12/24* (2006.01)
*H04L 12/26* (2006.01)
*H04L 29/08* (2006.01)

(52) U.S. Cl.
CPC .......... *H04L 43/50* (2013.01); *H04L 41/0813* (2013.01); *H04L 41/0816* (2013.01); *H04L 41/0866* (2013.01); *H04L 43/0811* (2013.01); *H04L 67/10* (2013.01); *H04L 41/0856* (2013.01)

(58) Field of Classification Search
CPC . H04L 43/50; H04L 41/0869; H04L 41/0813; H04L 41/0816; H04L 41/0856; H04L 41/0866; H04L 43/0811; H04L 67/10; G01R 31/021; G01R 31/2844; G06F 11/273
See application file for complete search history.

(56) References Cited

U.S. PATENT DOCUMENTS

| | | | |
|---|---|---|---|
| 5,311,516 A | 5/1994 | Kuznicki et al. | |
| 6,041,355 A | 3/2000 | Toga | |
| 6,496,014 B1* | 12/2002 | Cook | G01R 1/0416 324/538 |
| 6,823,479 B1 | 11/2004 | McElhaney, Jr. et al. | |
| 6,847,213 B2* | 1/2005 | Renken | H04L 43/50 324/628 |

(Continued)

FOREIGN PATENT DOCUMENTS

| EP | 2 627 041 A2 | 8/2013 |
|---|---|---|
| WO | 2014/145168 A1 | 9/2014 |
| WO | 2014/161003 A1 | 10/2014 |

OTHER PUBLICATIONS

International Search Report for International Application No. PCT/US2016/056102 dated Jan. 16, 2017, 12 pages.

(Continued)

*Primary Examiner* — Christopher Biagini
(74) *Attorney, Agent, or Firm* — Seed IP Law Group LLP

(57) ABSTRACT

A cable testing system and method including at least one testing device configured to perform cabling testing pursuant to a cabling testing configuration and a cloud-based server device configured to couple, via the Internet, to the at least one testing device. The server device includes a database configured to store one or more cabling testing configurations and a processor configured to send one or more cabling testing configurations from the database to the at least one testing device such that the at least one testing device performs a cabling test pursuant to the cabling test configuration received from the server device.

13 Claims, 3 Drawing Sheets

(56) References Cited

U.S. PATENT DOCUMENTS

| | | | |
|---|---|---|---|
| 7,024,548 B1* | 4/2006 | O'Toole, Jr. | H04L 41/0813 709/220 |
| 7,181,017 B1 | 2/2007 | Nagel et al. | |
| 7,457,866 B1* | 11/2008 | Hackworth | H04L 41/0273 709/223 |
| 7,479,776 B2* | 1/2009 | Renken | H04B 3/462 324/539 |
| 7,502,850 B2 | 3/2009 | Fellenstein et al. | |
| 7,623,784 B1* | 11/2009 | Pan | H04B 10/07 398/58 |
| 7,720,940 B1* | 5/2010 | Wilsey | H04L 41/12 709/220 |
| 7,860,115 B1 | 12/2010 | Scudder et al. | |
| 8,174,996 B2* | 5/2012 | Omar | H04L 43/50 326/10 |
| 8,355,926 B1 | 1/2013 | Hinz et al. | |
| 8,813,228 B2 | 8/2014 | Magee et al. | |
| 8,910,294 B1 | 12/2014 | Sennett et al. | |
| 8,935,765 B2 | 1/2015 | Morales | |
| 9,047,484 B2 | 6/2015 | Briere et al. | |
| 9,225,539 B2* | 12/2015 | Aguren | H04L 12/2697 |
| 9,397,922 B1* | 7/2016 | Collins | H04L 43/50 |
| 9,400,301 B2* | 7/2016 | Kanne | G01R 31/021 |
| 9,541,472 B2 | 1/2017 | Neeley et al. | |
| 9,749,039 B1* | 8/2017 | Chen | H04B 10/07 |
| 2002/0049962 A1 | 4/2002 | Kelbaugh et al. | |
| 2002/0144187 A1 | 10/2002 | Morgan et al. | |
| 2003/0134599 A1* | 7/2003 | Pangrac | H04L 29/06 455/67.14 |
| 2003/0159001 A1 | 8/2003 | Chalmer et al. | |
| 2004/0015744 A1 | 1/2004 | Klotz et al. | |
| 2004/0113604 A1* | 6/2004 | Renken | H04L 41/26 324/76.52 |
| 2004/0199342 A1* | 10/2004 | Graves | G06F 1/189 702/60 |
| 2005/0140377 A1* | 6/2005 | Komatsu | G01R 35/005 324/606 |
| 2006/0005065 A1* | 1/2006 | Nakayama | G01R 27/28 714/4.1 |
| 2006/0048200 A1* | 3/2006 | Jaworski | H04L 43/50 725/107 |
| 2006/0064434 A1 | 3/2006 | Gilbert et al. | |
| 2006/0085322 A1 | 4/2006 | Crookshanks | |
| 2007/0195711 A1* | 8/2007 | Morris | H04L 41/082 370/254 |
| 2007/0234410 A1 | 10/2007 | Geller | |
| 2008/0072050 A1 | 3/2008 | Klonover et al. | |
| 2008/0208806 A1 | 8/2008 | Dalfo et al. | |
| 2008/0275714 A1 | 11/2008 | Martinez | |
| 2008/0300945 A1 | 12/2008 | Simpson et al. | |
| 2010/0150319 A1* | 6/2010 | Irenze | H04L 41/22 379/21 |
| 2010/0304686 A1 | 12/2010 | Kennedy et al. | |
| 2010/0318929 A1 | 12/2010 | Hilton et al. | |
| 2011/0084132 A1 | 4/2011 | Tofighbakhsh | |
| 2011/0103242 A1 | 5/2011 | Hittel et al. | |
| 2013/0041613 A1 | 2/2013 | Bhide et al. | |
| 2013/0173962 A1 | 7/2013 | Li et al. | |
| 2013/0212207 A1 | 8/2013 | Ong | |
| 2013/0305091 A1* | 11/2013 | Stan | G06F 11/263 714/35 |
| 2013/0318589 A1 | 11/2013 | Ford et al. | |
| 2014/0036065 A1 | 2/2014 | Oakley et al. | |
| 2014/0047560 A1 | 2/2014 | Meyer et al. | |
| 2014/0281484 A1 | 9/2014 | Kurkowski et al. | |
| 2014/0281737 A1 | 9/2014 | Compann et al. | |
| 2014/0292348 A1 | 10/2014 | Kanne et al. | |
| 2014/0337674 A1 | 11/2014 | Ivancic et al. | |
| 2015/0106616 A1 | 4/2015 | Nix | |
| 2015/0163206 A1 | 6/2015 | McCarthy et al. | |
| 2015/0195182 A1 | 7/2015 | Mathur et al. | |
| 2015/0253379 A1 | 9/2015 | Lin et al. | |
| 2015/0256825 A1 | 9/2015 | Priest | |
| 2015/0278076 A1 | 10/2015 | Bs et al. | |
| 2015/0316600 A1* | 11/2015 | Davis | G01R 31/021 324/543 |
| 2015/0350095 A1 | 12/2015 | Raney | |
| 2015/0381467 A1 | 12/2015 | Girmonsky et al. | |
| 2016/0048112 A1 | 2/2016 | Pandurangan et al. | |
| 2016/0072693 A1 | 3/2016 | Michaelis | |
| 2016/0091549 A1* | 3/2016 | Snook | G01R 31/021 324/543 |
| 2016/0124034 A1* | 5/2016 | Shoor | G01R 31/021 324/539 |
| 2016/0301575 A1* | 10/2016 | Jau | H04L 41/12 |
| 2016/0381123 A1* | 12/2016 | Kanne | H04Q 9/00 709/224 |
| 2017/0093684 A1 | 3/2017 | Jayaraman et al. | |
| 2017/0094446 A1 | 3/2017 | Maggiore | |
| 2017/0104768 A1 | 4/2017 | Semenko et al. | |
| 2017/0141966 A1 | 5/2017 | Hittel et al. | |
| 2017/0142076 A1 | 5/2017 | Ford et al. | |
| 2017/0257365 A1 | 9/2017 | Gonzalez et al. | |
| 2017/0257376 A1 | 9/2017 | Dulkin et al. | |

OTHER PUBLICATIONS

Extended European Search Report, dated Feb. 21, 2017, for European Application No. 16204813.6—1958, 6 pages.

Extended European Search Report, dated Mar. 29, 2017, for European Application No. 16204801.1—1870, 10 pages.

International Search Report and Written Opinion, dated Jan. 24, 2017, for International Application No. PCT/US2016/057206, 13 pages.

"Turn on Cached Exchange Mode," Microsoft Support Center, 2007, URL=https://support.office.com/en-us/article/Turn-on-Cached-Exchange-Mode-7885af08-9a60-4ec3-850a-e221cled0c 1 c#ID0EAABAAA=2007_, 4 pages.

* cited by examiner

SYSTEM AND METHOD TO RECONCILE CABLING TEST RESULTS WITH CABLING TEST CONFIGURATIONS

FIELD OF THE INVENTION

The disclosed embodiments generally relates to network cabling testing, and more particularly, to reconciliation of test results with cabling test configurations.

BACKGROUND OF THE INVENTION

Modern networking systems can be networked through an interconnection of cables to provide increased communication, memory capacity and operating flexibility. Building, managing, and re-configuring the cable connections of a networked computer system is a complex task that may involve cable wiring diagrams, labeled cables, and connector reference designators. The task becomes increasingly complex with an increasing number of cables, connections and possible configurations, to the point where it is extremely difficult to effectively manage the cables, connections and configurations of the networked system in the traditional manner.

In this regards, cable testing devices and systems are utilized by technicians to test various cables types (e.g., copper and fiber optic cables) that facilitate data communications in buildings. For instance, every cable should be tested when installed and/or modified to verify that it is working properly. Each test is typically conducted from one termination point (usually in a wall jack) to a second termination point (often in a patch panel in a data/computer closet). It is noted the main termination point may be considered the data/computer closet, and the second termination point to be the wall jack. A technician typically has the main unit (the unit that would communicate directly with Link Ware Live) in the data closet, and the remote unit handled by an assistant who connects to the wall jacks. It is further noted an important aspect of each test is the cable testing/verification/certification configuration implemented in a cable testing device for a specific cable testing/verification/certification task.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a cable testing system and method for performing cabling diagnostics is described. The cabling system includes at least one testing device configured to perform cabling testing pursuant to a cabling testing configuration and a cloud-based server device configured to couple, via the Internet, to the at least one testing device. The server device includes a database configured to store one or more cabling testing configurations and a processor configured to send one or more cabling testing configurations from the database to the at least one testing device such that the at least one testing device performs a cabling test pursuant to the cabling test configuration received from the server device.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
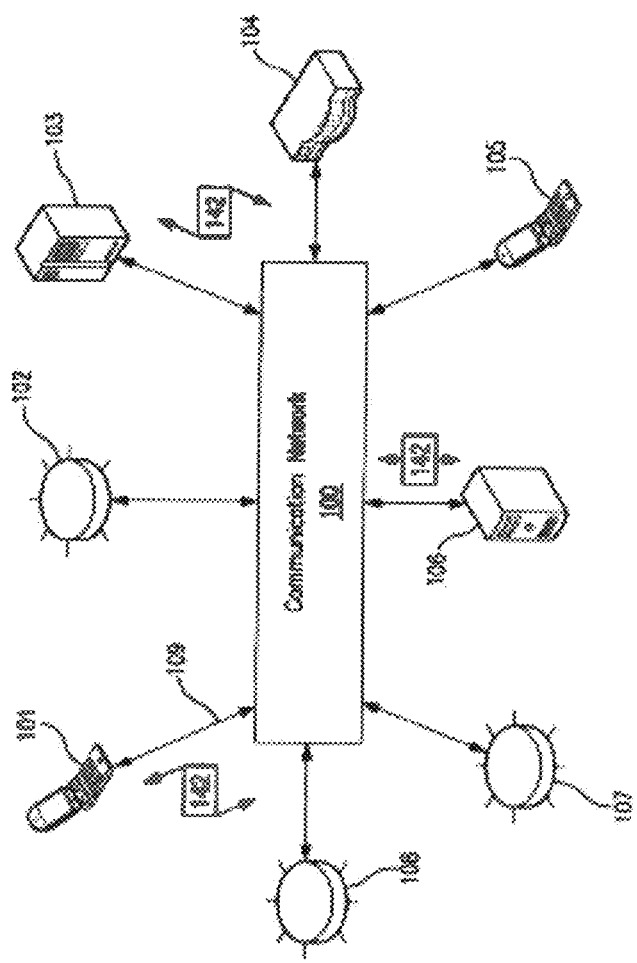
FIG. 1 depicts an exemplary communications network in which below illustrated embodiments may be implemented.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, cable testing device 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
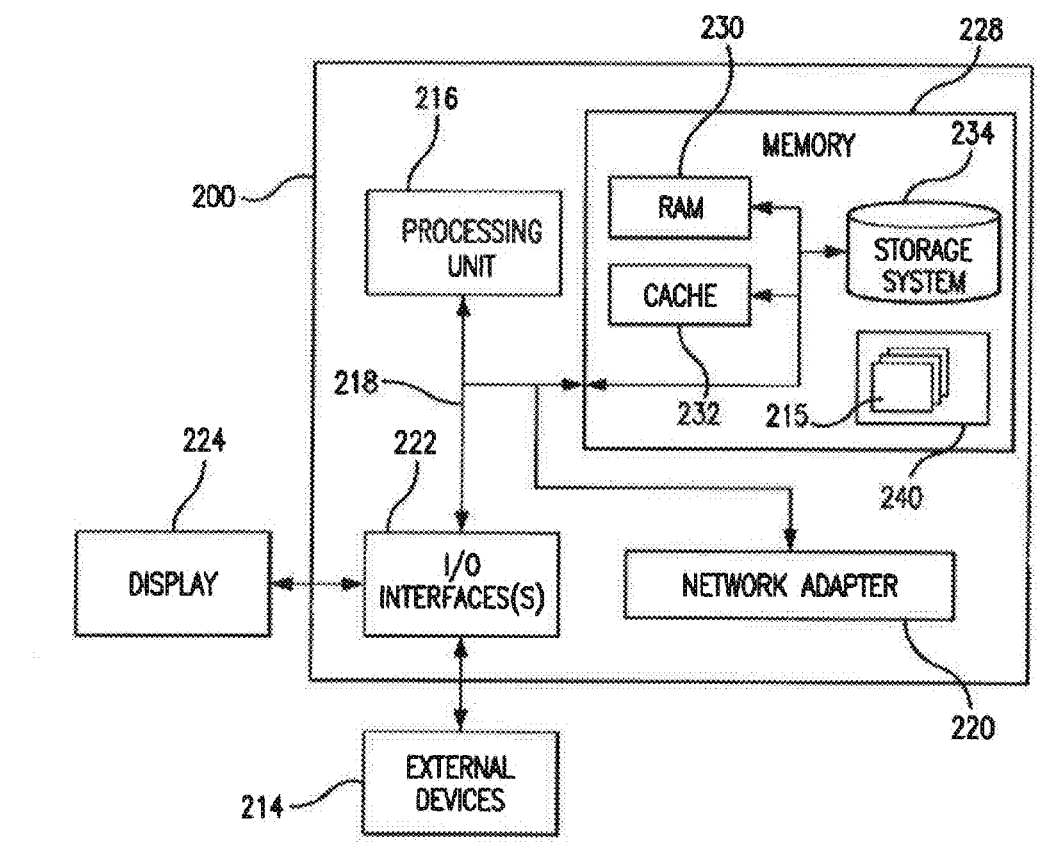
FIG. 2 depicts an example network device/node which may be used with the below illustrated embodiments.

FIG. 2 is a schematic block diagram of an example network computing device 200 (e.g., client computing device 103, server 106, smart phone device 105, cable testing device 107.) that may be used (or components thereof) with one or more embodiments described herein, e.g., as one of the nodes shown in the network 100. As explained above, in different embodiments these various devices are configured to communicate with each other n any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, object components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media and/or Solid State Drives (SSD) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
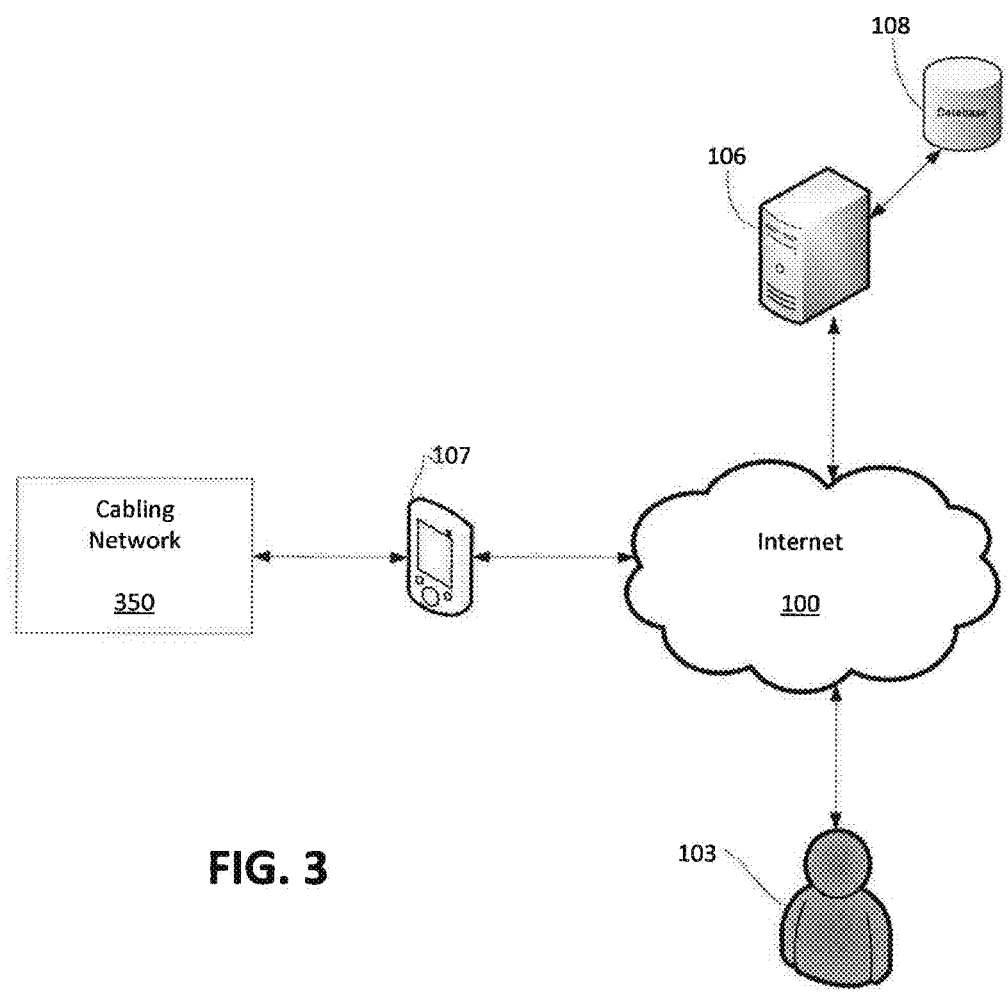
FIG. 3 depicts a cabling testing system 300 in accordance with the below illustrated embodiments.

With the exemplary communication network 100 (FIG. 1) and computing device 200 (FIG. 2) being generally shown and discussed above, description of certain illustrated embodiments of the present invention will now be provided. With reference now to FIG. 3, a cabling testing system 300 includes at least one cabling testing device 107. It is to be appreciated that for ease of illustration purposes, only a single testing device 107 is illustrated, however, it is to be understood cabling testing system 300 may encompass a variety of different types of cabling testing devices 107. Examples include, and are not limited to the flowing Fluke Network® instruments: OptiFiber® Pro OTDR; CertiFiber® Pro Optical Loss Test Set and the DSX-5000 CableAnalyzer™. It is to be further appreciated the illustrated embodiments of the present invention encompass the following types of tests for structured cables: verification, qualification and certification. With regards to certification testing, and as a non-limiting example, the Versiv™ product from Fluke Network® may be used to facilitate such cable certification.

The illustrated testing device 107 preferably includes a power source (e.g. a battery), one or more display elements (e.g. LED indicators, LCD displays, and the like), one or more cable ports (e.g. data cable jacks such as RJ 45 jacks, wire clamps, optical ports, and the like), and a processing device (e.g. a microprocessor) configured for transceiving signals via the ports and performing one or more circuit and/or network connectivity diagnostic tests and generating testing results (e.g. detected voltages on a cable, network connectivity data (e.g. IP addresses, bit rates, Packet Captures, Network Scans, Network Mapping, DNS resolution, DUCT, PING, TraceRoute, IPerf IPv4 and IPv6, etc.) associated with one or more networked devices connected to a cable, and the like). In another embodiment, the display elements of the testing device 107 (e.g. an LCD display screen) may be omitted and any display operations associated with the cable testing and/or results may be provided via a mobile device (e.g., device 105).

The testing device 107 may allow simultaneous operation of multiple applications. It is to be appreciated the testing device 107 may include an operating system (e.g., Linux) embedded hardware/server. Using a combination of the features of an operating system, the testing device 107 may be configured to receive firmware updates and test configurations by a network connection preferably via the Internet 100. As explained further below, the test configurations are preferably software packets sent from a cloud-based server device 106 (via network 100) to a testing device 106 to enable/configure a testing device 107 to perform predetermined testing routines upon a network 350 to be tested by a testing device 107. The cloud-based server 106 in one illustrated embodiment is wirelessly coupled to the testing device 107 but it is to be understand it is not to be limited to such a wireless connection (e.g., landline couplings may also be implemented). It is to be appreciated the cloud-based server device 106 may implement the Link Ware™ Live product from Fluke Network® to upload and consolidate certification test results (e.g., fiber and copper) from remote network sites 350 and manage projects in accordance with the teachings of the present invention.

For instance, in order to conduct a cabling diagnostic test on a cable, pursuant to a cable testing configuration received from server 106 (as discussed further below) (e.g. low-voltage CAT3, CAT5, CAT5E, CAT6, UTP, STP, SSTP and/or FTP data cables and/or standard voltage electrical wiring) forming a portion of a network 350 within a premise (e.g. a home, office, school, and the like), one or more ports of the testing device 107 may be coupled to a patch panel port of a patch panel in a data closet and an outlet port of an outlet, respectively, via patch cables. Accordingly, a cabling test (e.g. cable integrity tests, network connectivity tests associated with one or more networked devices (e.g. routers, switches, end-devices, etc.)) may be initiated by a technician whereby the testing device 107 may generate one or more test signals, pursuant to an aforesaid cable testing configuration, which results may be transmitted from the testing device 107 to the server 106 for analysis thereof. For instance, a testing device 107 may receive test signals and transmit response signals via a cable in a network 350. The testing device 107 may receive response signals and perform one or more processing operations to verify whether or not a cable is transmitting data as intended (e.g. that a cable is connected properly, that the component wires of the cable have been terminated correctly without being crossed, all the wires in the cable are all transmitting data, etc.). When data is obtained from a test, it may be stored in the testing device 107 and/or transmitted to the server device 106. Further, data may be aggregated for comparison with other facilities.

The cable testing device 107 preferably connects to a cloud-based server 106 (e.g. via the Internet) preferably using the built-in wireless (or wired) capabilities of the testing device 107. Once a secure connection has been established and verified, and as further discussed below, a software application on the testing device 107 downloads one or more cable testing configurations to be executed for a particular testing task for a network 350, and uploads and synchronizes test results to a related cloud-based database preferably residing on a cloud-based server device 106. The cloud-based server device 106 may implement at least one cloud-based application accessible by a testing device 107 and/or one or more additional user network devices such as a laptop or desktop computer 103.

A user computing device 103 may access the cloud-based application of the cloud-based server device 106 via preferably a web-browser software resident on the user device 103 running applications (e.g., Java applets or other applications), which may include application programming interfaces ("API's") to more sophisticated applications running on remote servers that provide the cloud-based service, as an example embodiment.

In an example embodiment, through web-browser software, a user can use a computer 103 to log on to cloud-based services (e.g., by the web-browser software resident on the computer 103 communicating with cloud-based server device 106) to access cloud-based applications for testing device 107. After logging-on to a cloud-based application on server 106, the user may create, edit, save and delete aforesaid cable testing configurations in the cloud-based server device 106, and may establish (set up) or change/edit various options, such as user preferences and/or system settings, and/or may receive or download software (e.g., operating system or other software) or software updates, various data files or media files, user preferences and/or system settings, and other information previously stored on the cloud-based server device 106.

In accordance with an illustrated embodiment, the cloud-based application implemented on the cloud-based server device 106 may provide various cable testing configurations facilitating cabling testing by one or more testing devices 107. Accordingly, what is illustrated is a cloud-based computer server 106 for performing cabling diagnostics from test results received from at least one testing device 107 configured to perform cabling testing pursuant to a cabling testing configuration regarding a network 350 to be tested.

In an illustrated embodiment, the cloud based server 106 includes a database 108 configured to store one or more cabling test configurations. The cloud based server 106 is configured to transmit one or more cabling test configurations from the database 108 to the at least one testing device 107 such that the at least one testing device 107 performs a cabling test pursuant to the received cabling test configuration. The cloud based server 106 is further configured to receive cabling test results from the at least one testing device 107 (via network 100) and associate the received cabling test results with a designated work project intended to be performed for one or more cables/devices in network 350.

The cloud based server 106 is additionally preferably configured to determine that the test configuration used to obtain the received test results is associated for implementation with the designated work project. The cloud based server 107 is further preferably configured to determine that the test configuration used to obtain the received test results is the same test configuration sent to the at least one testing device 107 that was intended to be implemented. The cloud based server 106 is then preferably configured to determine the received test results to be non-complaint when the test configuration used to obtain the received test results is different than the test configuration sent to the at least one testing device that was intended to be implemented. In the event the test configuration used to obtain the received test results is different than the test configuration sent to the at least one testing device 107 that was intended to be implemented, the cloud based server 106 may then dynamically generate test configurations to be implemented on the received test results, which are configured to satisfy the noncompliant results. For instance, a determination may be made as to whether test results were obtained with at least one of: incorrect cabling testing configurations, test limits and incorrect cable type parameters.

Further, and in accordance with the illustrated embodiment, the cloud based server 106 is configured to determine if sent testing configurations were altered in the at least one testing device 107. And as also mentioned above, the cloud based server 106 may be configured to enable a remote user (via a user device 103) to add via the Internet and/or edit via the internet one or more cabling testing configurations stored in the database 108.

It is to be appreciated that certain advantages of the illustrated embodiments include (and are not limited to) generating test configurations on the testing device, and, using reconciliation, have these test configurations added to the test configurations recorded in the cloud. Another advantage is the ability to generate test configurations on the test device, and uploading them to the cloud.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims re intended to cover such modifications and arrangements.

What is claimed is:

1. A cable testing system, comprising:
   at least one testing device that performs cabling testing pursuant to a cabling testing configuration that defines testing routines to be executed by the at least one testing device to perform a cabling test; and
   a cloud-based server device that is in communication, via the Internet, with the at least one testing device, the server device including:
      a database that stores a first cabling testing configuration;
      a processor that executes computer instructions to:
         send the first cabling testing configuration from the database to the at least one testing device to cause the at least one testing device to use the first cabling testing configuration to configure the at least one testing device to execute the testing routines for the cabling test;
         receive cabling test results from the at least one testing device in response to the at least one testing device generating test signals pursuant to the testing routines being executed by the at least one testing device;
         determine that the received cabling test results are non-compliant results by determining if there is a difference between the first cabling testing configuration sent to the at least one testing device and a second cabling testing configuration used by the at least one testing device to perform the cabling test; and
         provide, to a remote user, access to the received cabling test results.

2. The system as recited in claim 1, wherein the cabling test performed by the at least one testing device includes performing at least one of a cabling certification, qualification, and verification of a cable.

3. The system as recited in claim 1, wherein the processor executes further computer instructions to associate the received cabling test results with a designated work project.

4. The system as recited in claim 3, wherein the processor executes further computer instructions to determine that the second cabling testing configuration used to obtain the received cabling test results is associated for implementation with the designated work project.

5. The system as recited in claim 1, wherein the processor executes further computer instructions to determine that the second cabling testing configuration used to obtain the received cabling test results is a same cabling testing configuration as the first cabling testing configuration sent to the at least one testing device.

6. The system as recited in claim 1, wherein the processor executes further computer instructions to determine if the first cabling testing configuration sent to the at least one testing device was altered in the at least one testing device to result in the second cabling testing configuration used to obtain the received cabling test results.

7. The system as recited in claim 1, wherein the processor executes further computer instructions to determine if the received cabling test results were obtained with at least one of: incorrect cabling test configurations, incorrect test limits and incorrect cable type parameters.

8. The system as recited in claim 1, wherein the processor executes further computer instructions to enable the remote user to add one or more cabling testing configurations to the database.

9. A cloud-based computer server, comprising:
   a memory that stores instructions;
   a database that stores one or more cabling test configurations that define testing routines to be executed by a cable testing device to perform cabling tests;
   a processor disposed in communication with said memory and database, wherein said processor upon execution of the instructions performs actions to:
   send a first cabling test configuration of the one or more cabling test configurations, via the Internet, from the database to the cable testing device to cause the cable testing device to use the first cabling test configuration to enable the cable testing device to execute the testing routines for a cabling test;
   receive cable test results from the cable testing device in response to the cable testing device generating test signals pursuant to the testing routines being executed by the cable testing device;
   determine whether the cable test results are compliant with the first cabling test configuration based on a comparison between the first cabling test configuration sent to the cable testing device and a second cabling test configuration used by the cable testing device to perform the cabling test; and
   provide, to a remote user, access to the cable test results.

10. The cloud-based computer server as recited in claim 9, wherein the cabling test includes performing at least one of a cabling certification, qualification, and verification of a cable.

11. The cloud-based computer server as recited in claim 10, wherein the processor upon execution of the instructions performs further actions to associate the cable test results with a designated work project.

12. The cloud-based computer server as recited in claim 11, wherein the processor upon execution of the instructions performs further actions to determine that the second cabling test configuration used to obtain the received test results is associated for implementation with the designated work project.

13. The cloud-based computer server as recited in claim 10, wherein the processor upon execution of the instructions performs further actions to determine that the second cabling test configuration used to obtain the received cable test results is a same test configuration as the first cabling test configuration sent to the at least one testing device.

* * * * *